(12) United States Patent
Guevin et al.

(10) Patent No.: US 12,106,143 B2
(45) Date of Patent: Oct. 1, 2024

(54) SCHEDULING COMPLEX JOBS IN A DISTRIBUTED NETWORK

(71) Applicant: ADTRAN, Inc., Huntsville, AL (US)

(72) Inventors: Thomas F. Guevin, Nashua, NH (US);
Dennis Cox, Huntsville, AL (US);
Joshua Neely, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 452 days.

(21) Appl. No.: 17/381,986

(22) Filed: Jul. 21, 2021

(65) Prior Publication Data

US 2023/0029198 A1 Jan. 26, 2023

(51) Int. Cl.
G06F 9/48 (2006.01)
H04L 29/08 (2006.01)
H04L 67/10 (2022.01)
H04L 67/61 (2022.01)

(52) U.S. Cl.
CPC .......... *G06F 9/4881* (2013.01); *G06F 9/4831* (2013.01); *H04L 67/10* (2013.01); *H04L 67/61* (2022.05)

(58) Field of Classification Search
CPC ..... G06F 9/4881; G06F 9/4831; H04L 67/61; H04L 67/10
See application file for complete search history.

(56) References Cited

U.S. PATENT DOCUMENTS

| | | | |
|---|---|---|---|
| 6,988,139 B1 | 1/2006 | Jervis et al. | |
| 9,529,624 B2* | 12/2016 | Ashok | G06F 9/4881 |
| 10,841,236 B1* | 11/2020 | Jin | H04L 67/1014 |
| 11,080,031 B2* | 8/2021 | Bequet | G06F 9/46 |
| 11,966,775 B2* | 4/2024 | Rj | G06F 9/4881 |
| 2012/0198462 A1* | 8/2012 | Cham | G06F 9/5038 |
| | | | 718/103 |

(Continued)

FOREIGN PATENT DOCUMENTS

EP 1739539 1/2007

OTHER PUBLICATIONS

Extended European Search Report in European Appln No. 21211694.1, dated Jun. 24, 2022, 14 pages.

(Continued)

*Primary Examiner* — Nazia Naoreen
(74) *Attorney, Agent, or Firm* — Fish & Richardson P.C.

(57) ABSTRACT

Methods, systems, and apparatus, including computer programs encoded on a computer storage medium, for job management in a distributed network include a prioritizer that determines a priority level for a job and inserts the job into a priority queue based on the priority level, a scheduler that, for each element in the distributed network, requests the priorities of one or more jobs scheduled for execution, evaluates, based on the priorities of the one or more jobs scheduled for execution, the priority of a particular job with respect to the element, determines, based on the priorities, that the network element is free to perform job processes, and upon determining that a network element is free, scheduling a particular job for execution, and an executor that determines that all local and remote resources required for the scheduled job are available and executes the job according to processes defined within the distributed network.

17 Claims, 6 Drawing Sheets

(56) References Cited

U.S. PATENT DOCUMENTS

| | | | |
|---|---|---|---|
| 2016/0125293 A1* | 5/2016 | Patel | H04L 67/10 |
| | | | 706/47 |
| 2019/0377597 A1 | 12/2019 | Yuan et al. | |
| 2020/0348968 A1* | 11/2020 | Huchachar | G06F 9/445 |
| 2021/0133179 A1* | 5/2021 | Lee | G06F 9/4881 |

OTHER PUBLICATIONS

Silberschatz et al., "Operating System Concepts—Fourth Edition, Passage," Operating System Concepts, Jan. 1994, 97-115.
Partial European Search Report in European Appln No. 21211694.1, dated Apr. 28, 2022, 13 pages.

\* cited by examiner

SCHEDULING COMPLEX JOBS IN A DISTRIBUTED NETWORK

BACKGROUND

This specification relates to prioritizing and scheduling complex jobs in a distributed network.

Distributed networks can be used to perform jobs that are normally performed by a single entity. Each job represents a logical unit that makes progress toward a goal. Jobs can be generated, assigned, and executed in a distributed network with more flexibility and reliability than in individual node systems which perform each job and any sub-tasks sequentially.

SUMMARY

This specification describes a system implemented as computer programs on one or more computers in one or more locations that performs actions to optimize a variety of network systems having different capabilities. As used herein, the term "optimize" is used to refer to improvements over other systems, and should not be interpreted as a single optimum result.

In one general implementation, aspects of the subject matter described in this specification can be embodied in a job management system for optimizing the distribution and assignment of jobs in a distributed network, including a prioritizer that prioritizes job requests by performing operations including receiving a request for a job to be performed by the distributed network, determining, based on metadata of the job within the request, a priority level for the job, inserting, based on the determined priority level for the job, the job into a priority queue, a scheduler that schedules jobs for execution by performing operations including, for each element in the distributed network, requesting, from the prioritizer and for the element, the priorities of one or more jobs scheduled for execution, evaluating, based on the priorities of the one or more jobs scheduled for execution, the priority of a particular job with respect to the network element, determining, based on the priorities of the one or more jobs, that the network element is free to perform job processes, in response to determining that a network element is free to perform job processes, scheduling a particular job for execution, and an executor that executes scheduled jobs within the distributed network by performing operations including determining that (i) all local resources required for the scheduled particular job are available and (ii) all remote resources required for the scheduled particular job are available, according to processes defined within the distributed network, the scheduled particular job.

In some implementations, the executor performs operations further including identifying, based on a response from one or more elements of the distributed network, derivative work, and providing, to the prioritizer and without details of the effects of the scheduled particular job on the distributed network, a second request for a job based on the derivative work.

In some implementations, the executor performs operations further including determining, based on a response from one or more elements of the distributed network, that an error has occurred, and providing, to the scheduler, an error report indicating the error.

In some implementations, the metadata of the job indicates at least one of the necessity of the job, the status of the job, or the device limits.

In some implementations, the prioritizer performs operations further including expanding, based on conditions of the distributed network, the job into two or more jobs.

In some implementations, the prioritizer performs operations further including receiving, from a requesting entity, a request to cancel an existing job, determining, based on metadata of the existing job, the status of the existing job, in response to determining that the job status is that the existing job is running, returning, to the requesting entity, an error, in response to determining that the job status is that the existing job is scheduled for execution, providing, to the scheduler, a request that the scheduler remove the existing job from the scheduled queue, and in response to determining that the job status is that the existing job has been prioritized for scheduling, removing, from the priority queue, the existing job.

In some implementations, in response to determining that the job status is that the existing job is running further includes providing, to the scheduler, a request that the scheduler remove the existing job from the scheduled queue.

Particular embodiments of the subject matter described in this specification can be implemented so as to realize one or more of the following advantages.

The system as described in this specification implements a distributed job management system compatible with a variety of network systems that include a heterogeneous population of network components and end users being served. Each component may have different capabilities and can perform different actions and processes (e.g., network troubleshooting actions, or any other appropriate actions in a distributed network system). The job management system provides the flexibility for a job management process to service and manage jobs for different systems, accounting for and adapting to network conditions and capabilities of both network components and end user devices.

The job management system supports networks for various applications without requiring an ad hoc solution to be developed and optimized for each different network. For example, the system can be integrated with heterogeneous networks having a spectrum of end users, such as students, teachers, and information technology administrators. These networks can include end user devices with different capabilities, such as wireless consumer smartphones or industrial computers connected to the network through an encrypted, wired connection, among other types of devices having various processing and communication capabilities. For example, the job management system is able to support networks of varying density (sparse and dense environments), varying levels and quality of services provided to the end users, varying devices (homogeneous and heterogeneous deployments), and across varying geographies.

The distributed job management system is able to handle high volume jobs while also efficiently managing low volume jobs, and allows for different parts of the network to be serviced by different entities and users. Because the job management system is able to utilize existing work flows and direct the prioritization and scheduling of new jobs, the system can accommodate a wide variety of existing network infrastructures and populations. Additionally, the job management system is modular, allowing, for example, for one portion of a network to be serviced by a specialized vendor while the rest of the network is serviced by a separate vendor. The job management system allows users of existing networks to maintain the customization of their network and provides a degree of control over the prioritization, scheduling, and execution of jobs that is generally not available for a solution that has not been tailored to the particular system and its capabilities and processes.

The job management system allows users to define their own work flows and determine whether particular jobs are important, providing flexibility and control over the processes of the network. Additionally, the job management system supports existing network systems that otherwise may not be supported due to their size, complexity, or resources. The job management system provides an efficient and adaptable solution for a variety of networks and allows users (both administrative and end users) to experience the advantages of having customizable job management without imposing additional constraints on the system.

The distributed job management system adapts to the capabilities and work flows as defined within the system with which it is integrated. Due to the adaptable nature of the job management system, in which existing work flows and processes can be used as part of the job management processes, the job management system does not require that the details of each network be defined in advance or remain consistent. Additionally, because jobs are prioritized, assigned, and executed as they are received, the job management system can quickly adapt to changing network conditions, including failures, and allows for more flexibility in the event of an outage or malfunction of a particular node or subsystem.

The system as described in this specification provides an effective integration pathway to various network agents and devices to accommodate demand from various different clients. Specifically, the system includes a distributed job management system that uses existing work flows for particular processes and prioritizes and schedules jobs within the context of existing systems. In contrast, some conventional systems lack an effective job distribution system that decentralizes job management and allows the system to be easily integrated with existing systems having various capabilities and populations. For example, in some conventional systems, a new job management system would need to be generated and adapted for each new system. These job systems would need to be tailored specifically for the capabilities of the devices in the system, and may not provide much control over how and when a job is completed.

The distributed job management system uses distributed logic, and thus there is no centralized system for job management. Thus, the system is more robust than systems that cannot adapt in the case of failure of any one component. Additionally, the system is modular and makes no assumptions regarding the capabilities of the end components performing particular portions of a job or portion of a job.

The distributed job management system can also adapt based on feedback in the form of error messages and derivative work, or jobs created based on (derived from) a different job. The distributed nature of the job management system allows both jobs and information to be distributed among different nodes within a network and allows the system to be easily integrated with a wide range of distributed network systems, such as network protocols and multi-agent systems. For example, if an action is applied to a distributed network that is not centrally managed, any additional jobs or processes that need to be carried out may not be determinable until an individual device is queried or otherwise communicated with. The distributed job management system is able to efficiently prioritize, schedule, and execute jobs as the jobs are created within a distributed network, whereas many conventional systems require jobs and any dependent jobs to be predefined such that the schedule can be created prior to execution. The distributed job management system can accommodate the dispersed nature of jobs arising from a distributed network and provides a degree of control over the jobs and processes being executed within the system to users of the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification discloses methods, systems, apparatus, and computer readable media for a job management system that performs actions in a distributed network.

In a complex distributed network, jobs can be triggered based on schedules, user input, administrator intervention, and/or asynchronous network events (which could be derived from previous jobs), among other events. In general, end-to-end networks are sensitive to changes in network conditions, and must account for concurrency, contention, and failures. Due to these sensitivities, it may not be possible to fully execute jobs within end-to-end networks, especially if network segments are busy or unavailable. This can lead to a backlog of un-executed jobs, duplicate scheduling, and congestion, and complex intervention from a user or administrator may be required. Within a complex distributed network, simple job processes such as a Queue process or an Execute process may not be sufficient, especially in heterogenous and modular networks, where the behavior of particular network elements is unknown until the jobs are performed.

An associated problem is that the status of jobs throughout a network is difficult to visualize. For example, complex upgrades and reboots of thousands of network elements can be difficult to represent in a readily understood format. For many users and/or administrators of a network, being able to quickly determine the state of the jobs and specify what to do in the event of failures (e.g., automatically retry, manual intervention, etc.) is advantageous.

The job management system accommodates the disperse nature of job creation within a distributed network, allows a user to easily visualize the status of specific jobs, and provides control over the prioritization, scheduling, and execution of jobs, including the ability to specify what to do in the event of a failure and to cancel a job.

The job management system includes a prioritizer that analyzes a job to determine a particular job's place in a priority queue based on network conditions and the job parameters. The job management system also includes a scheduler that evaluates the priority and place of each job placed in the priority queue and whether a job has been scheduled in order to schedule the job to be performed. The job management system includes an executor that executes jobs in the order that they are scheduled.

Each of the above components attempts to resolve failures in job scheduling and execution should any failures arise, and is able to troubleshoot any problems that arise within the system. Additionally, because the system is able to receive feedback and user input regarding what to do in the event of a failure or other error, the system provides flexibility in handling events that is not generally available for distributed networks. Additionally, the system is able to accommodate job cancellation requests, and may be able to reduce the number of jobs being executed in order to reduce the amount of duplicate or unnecessary jobs.

Figure 1:
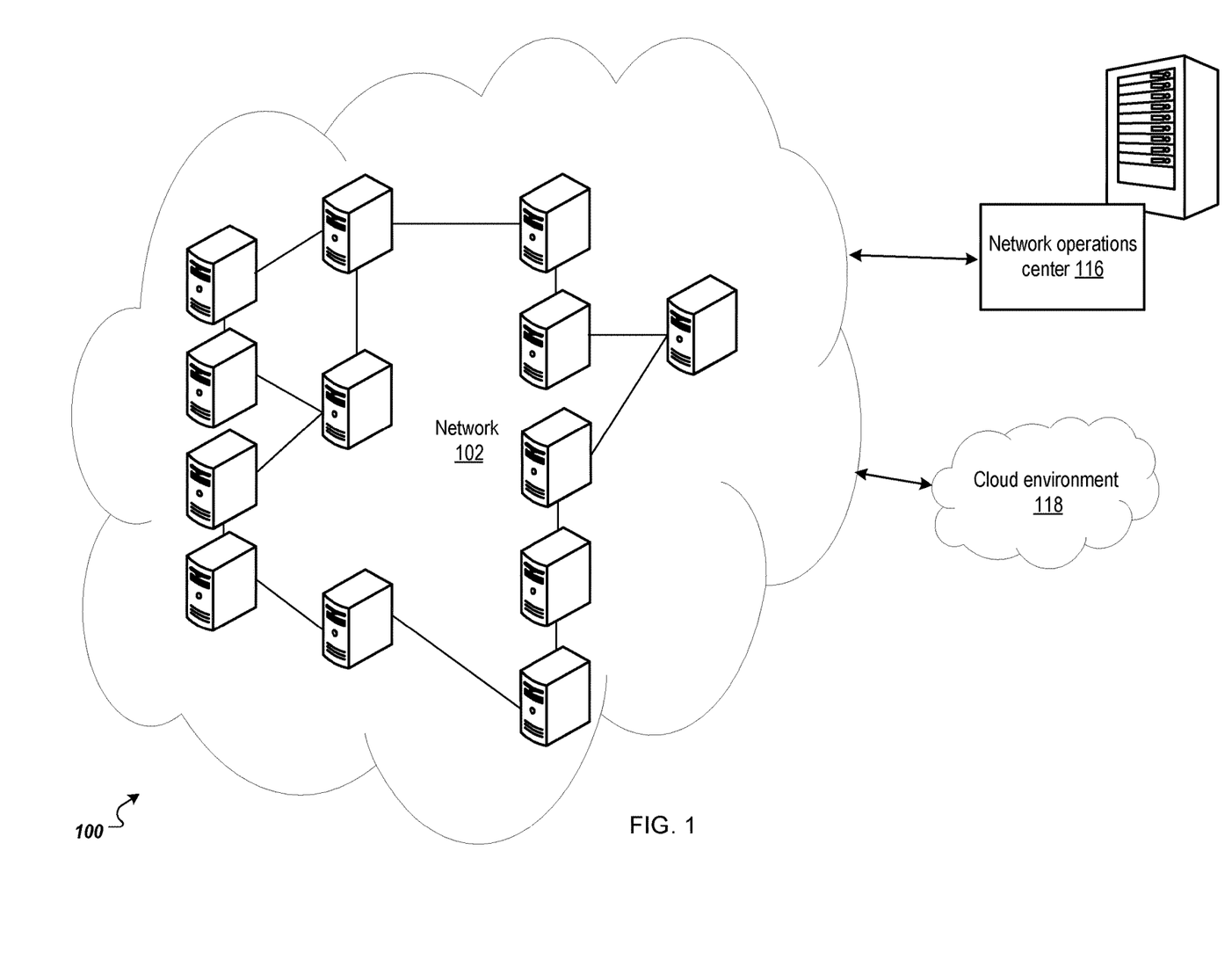
FIG. 1 is a block diagram of an example distributed network.

FIG. 1 is a block diagram of an example distributed network 100 including a network 102. Generally, a network includes a system of nodes connected by transmission links that enables the transfer of data between multiple users. Transmission links enable transmission of data (e.g., text, images, audio, or any form of data) between nodes. Examples of transmission links include wire links, fiber-optic cable links, radio wave links, and any other link that enables any kind of communication through electromagnetic waves. A node includes hardware, software, or both that implements methods for routing data between nodes (e.g., circuit switching, message switching, or packet switching) to enable the transmission of data to particular destinations (e.g., a user device connected to a node by a transmission link). Examples of telecommunications networks include local area networks (LANs), wide area networks (WANs), telephone networks, or a combination thereof.

The example network 100 includes users who transmit and/or receive data over the network 102 using user devices such as smartphones, televisions, computers, or any other appropriate device.

The network operations center 116 includes one or more locations from which a network operator (e.g., an Internet service provider) manages operation of the distributed network 100. Managing the operation of a distributed network includes performing different actions in the network, including performing job management as described in this specification.

The distributed network 100 includes a cloud environment 118 that provides remote access (e.g., over the Internet) to computing resources (e.g., memory and processing resources). The network operations center 116 may store and/or process data in the cloud environment 118.

The job management system as described in this specification may be implemented using hardware and/or software components that are located in the network 102, the cloud environment 118, the network operations center 116, a combination thereof, or any other appropriate location.

Figure 2:
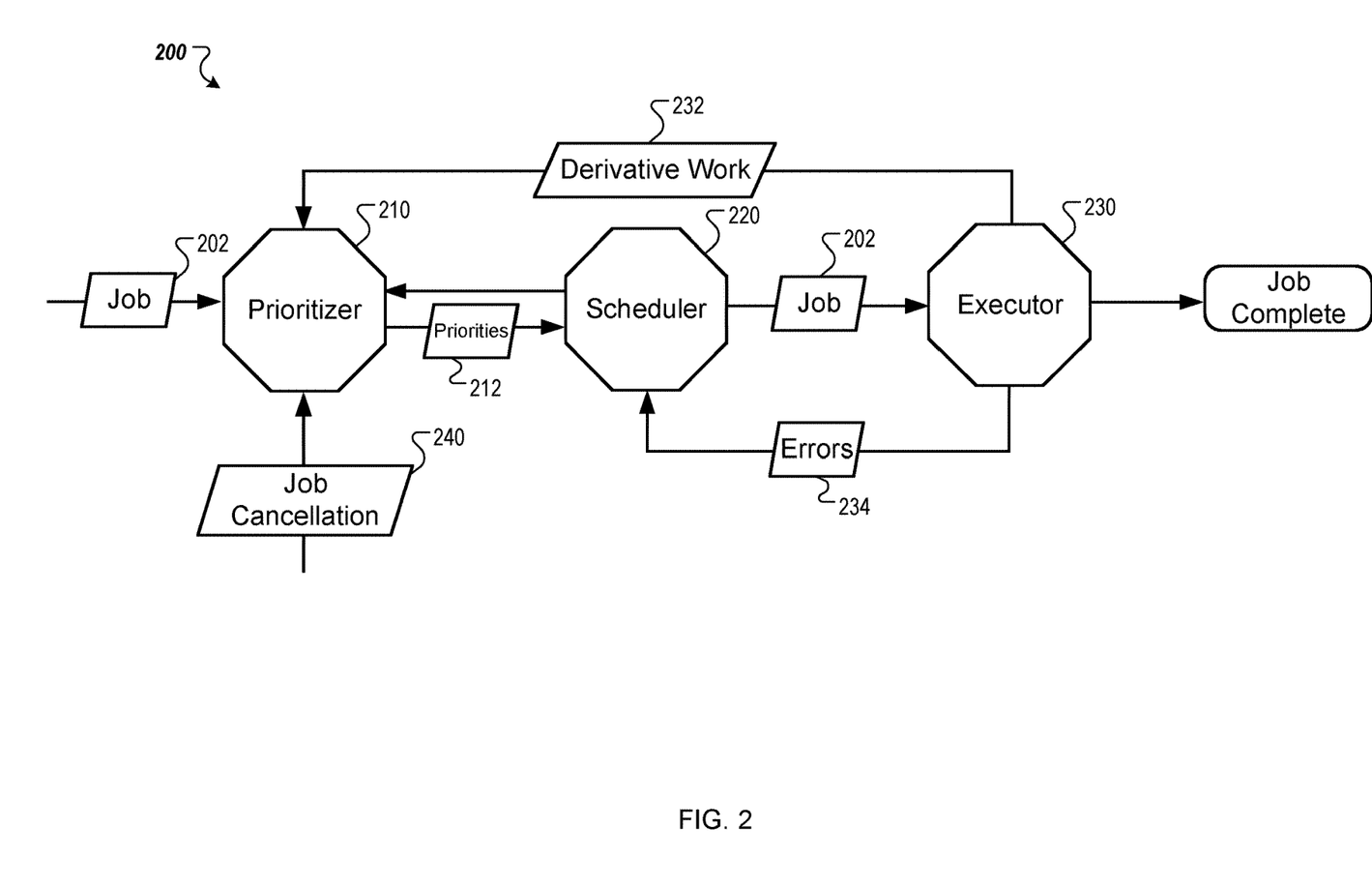
FIG. 2 is a data flow of an example process for job management within a distributed network.

FIG. 2 shows an example process 200 for job management within a distributed network that begins with job creation and ends with job completion. The process 200 is performed by a system of modules, including a prioritizer 210, a scheduler 220, and an executor 230, that are an example of a system implemented as computer programs on one or more computers in one or more locations in which the systems, components, and techniques described below are implemented. Each of the modules can include, for example, one or more processors, and may be implemented on a single computer or across different computers. The modules can refer to separate, physical modules or software modules that can be implemented on a single physical device.

The job management system includes various protocols and processes to manage complex job scenario and guide jobs from creation to completion. Within this description, jobs are processes to be executed within a particular distributed network, and can include multiple sub-portions, such as specific tasks, threads, or sub-processes.

Each job includes metadata indicating characteristics of the job that allow the job management system to properly prioritize, schedule, and execute the task, in addition to performing other processes, including troubleshooting, automatically retrying a failed job, and error reporting.

Job metadata can include the field "Job Necessity." For example, this field can describe the necessity of the job's completion. Example Job Necessity values include Best Effort, which means that these jobs, on their arrival, are provided with the system's best effort, such that the required resources are provided if available, and otherwise, the jobs are queued for the fulfillment of their requirements when the resources would be available; Stop on Error, which means that if an error occurs, the network should not try executing the job again; Eventually Complete, which means that there is no rush for the job's completion, but that the network should retry if an error (or errors) occurs; or Immediate Run, which means that the network should allow the job to bypass all other jobs and begin execution as soon as the job is inserted in the scheduled queue for execution. The network and/or the job management system can utilize other Job Necessity values as well. In some implementations, other Job Necessity values can be defined by the network and/or the job management system, or users of the network and/or system. The Job Necessity value can be assigned automatically by the network and/or job management system, or by users of the network and/or system.

The Job Necessity value can be represented as a string (e.g., as 'Best Effort'), a value between 0-10 or another range, or a binary value, among other types of values. For example, the Job Necessity value can be represented as a value between 0-10, with 0 being least necessary and 10 being most necessary. In one example, if a software upgrade is being scheduled, it would be good to schedule and execute, but is not as urgent as a failover situation and needing to recover a part of the network. In this example, the software upgrade can be assigned a value of 2, while addressing a failover situation would be assigned a value of 10.

Job metadata can include the field "Job Priority." For example, this field can describe the priority to be given to a job. The priorities can be assigned to jobs and used to break ties between competing jobs. In some implementations, other metadata can be supplied by the network or the user creating the job to help describe the priority of a job. The network and/or the job management system can also utilize other Job Priority values. In some implementations, other Job Priority values can be defined by the network and/or the job management system, or users of the network and/or system.

Job metadata can include the field "Job Status." For example, this field can describe the status of a job run, and can be one of: Pending, Running, Failed, Completed, Canceled, and Unstartable. The network and/or the job management system can utilize other Job Status values as well. In some implementations, other Job Status values can be defined by the network and/or the job management system, or users of the network and/or system.

Job metadata can include the field "Device Limits." For example, this field can describe the job processing capabilities of a particular device, including whether a device can handle multiple jobs in parallel or a single job at a time or whether the device can maintain and/or has a queue of jobs. The network and/or the job management system can utilize other Device Limits values as well. In some implementations, other Device Limits values can be defined by the network and/or the job management system, or users of the network and/or system.

Other data can be provided with a particular job to inform the job management process, include the expected amount of time that the job will take to execute, the particular resources required to complete the job, particular heuristics for the job management system or the distributed network to monitor during the pendency of the job. Because the job management system accepts input from users and/or administrators, the job management provides flexibility to be compatible with various types of systems having different resources. Additionally, the heuristics and characteristics being monitored allows the job management system to accommodate changes in network conditions, resource availability, and device capabilities. The job management system and/or distributed network can also report the values of the particular heuristics or characteristics being monitored or make the values available for querying.

The system includes various modules that perform the job management process as described herein.

A job 202 can be created and provided to the job management system for management and execution within a distributed network.

Figure 3:
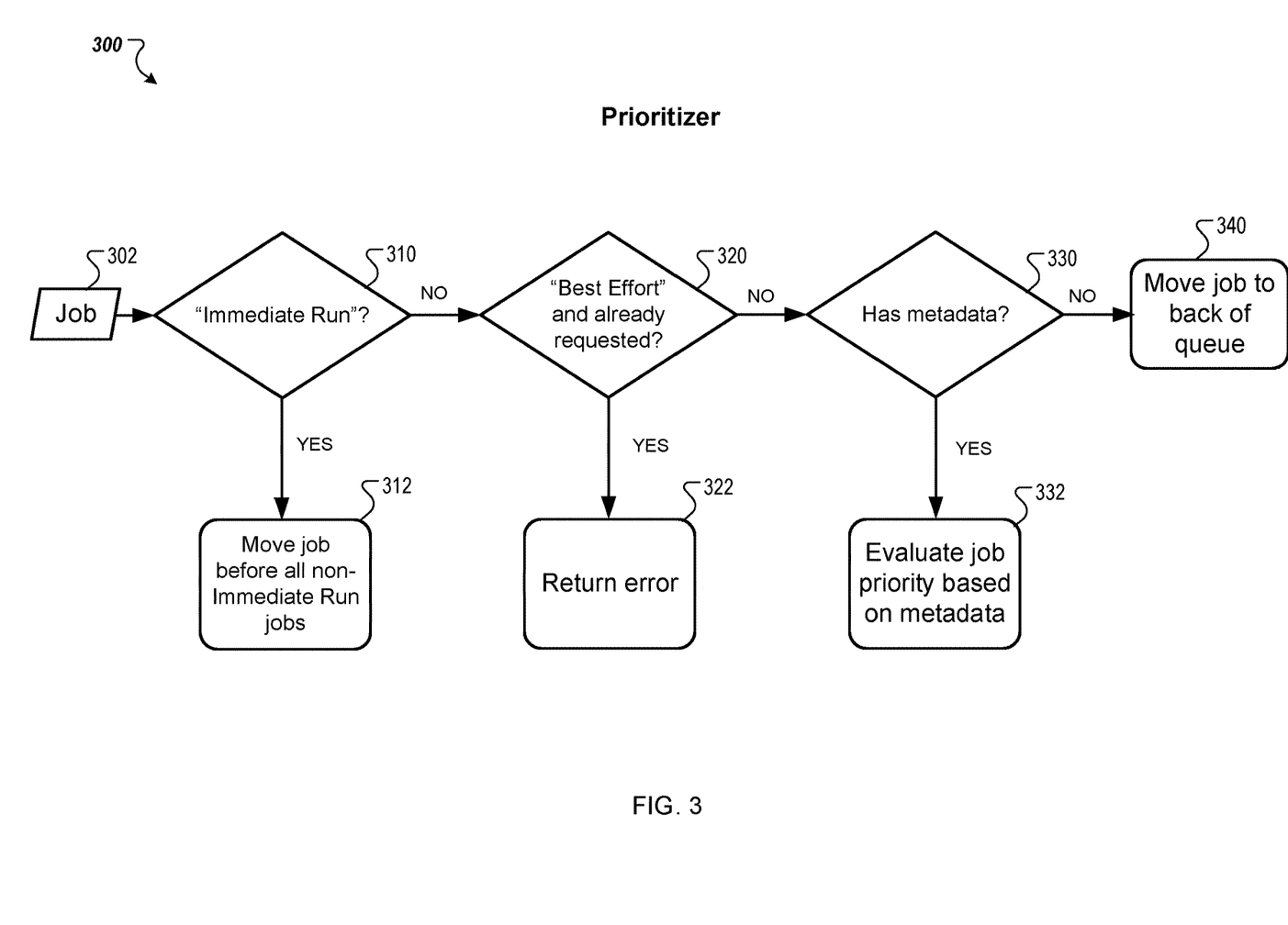
FIG. 3 is a flow diagram of an example process for prioritizing jobs within a job management system for a distributed network.

For example, the system includes a prioritizer 210 which triages new job requests, expands them into workable chunks, and uses heuristics to place them into priority order for running based on the job configuration and the network status as described in further detail with respect to FIG. 3. In some implementations, the prioritizer 210 can be implemented as software. In some implementations, the prioritizer 210 can be implemented as a component including one or more processors. The prioritizer 210 can also be used to cancel a job, or even reject a Best Effort job if a similar job is already in the scheduled queue. The prioritizer 210 will allow an Immediately Run job to cut the line for other non-Immediate Run jobs (immediate jobs are run at the time order of insertion). The prioritizer 210 can also cancel jobs while they are in the priority queue.

Figure 4:
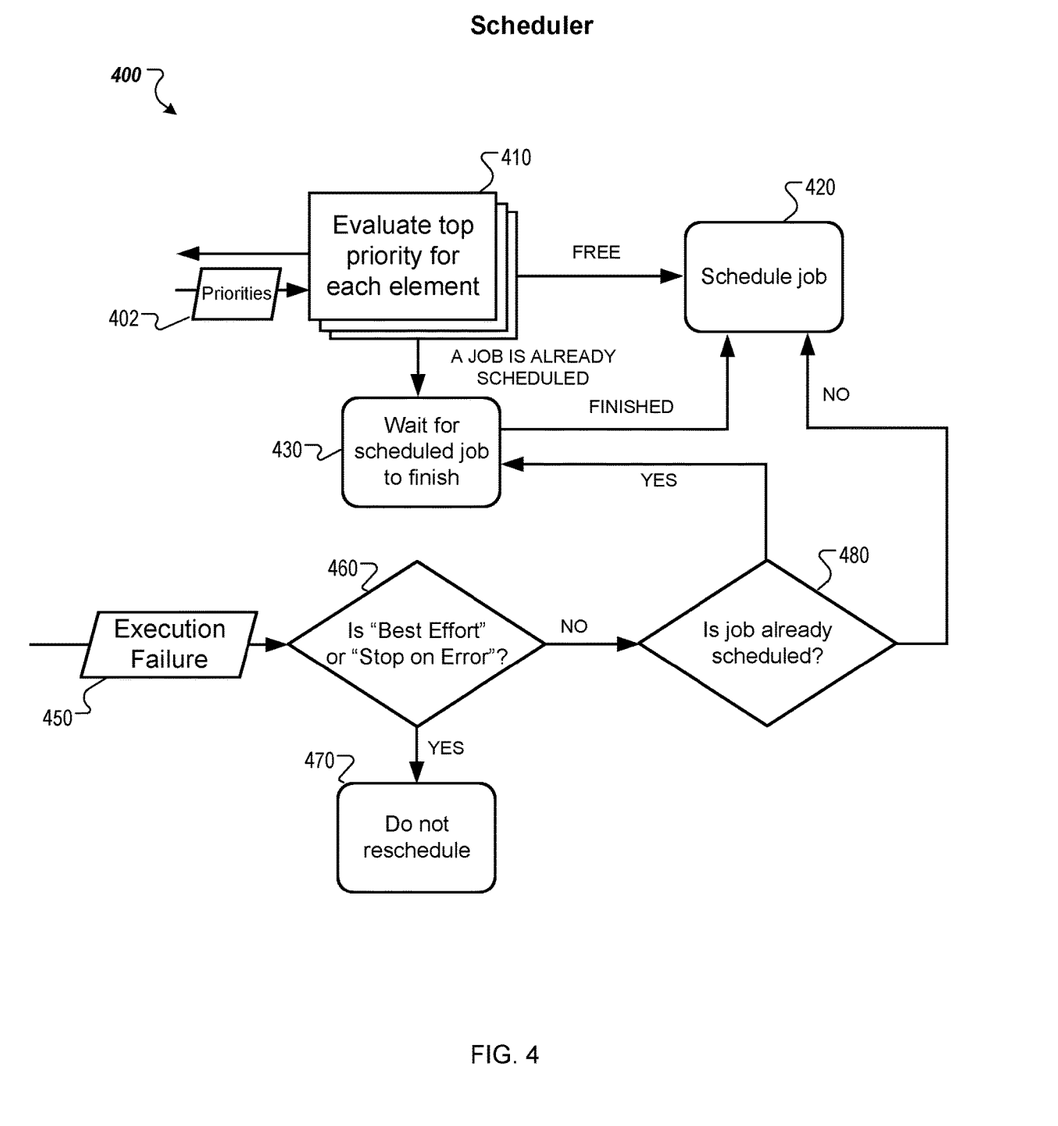
FIG. 4 is a flow diagram of an example process for scheduling jobs within a job management system for a distributed network.

The system includes a scheduler 220, which evaluates prioritized jobs from the prioritizer 210, based on other prior scheduled work and status as described in further detail with respect to FIG. 4. In some implementations, the scheduler 220 can be implemented as software. In some implementations, the scheduler 220 can be implemented as a component including one or more processors. For example, scheduler 220 can request priorities 212 for particular jobs from the prioritizer 210 for evaluation when scheduling jobs. If the proper resource, priority, and queue conditions for a job are met, the scheduler 220 will schedule the job to run. The scheduler 220 is aware of the status of all ongoing jobs.

Figure 5:
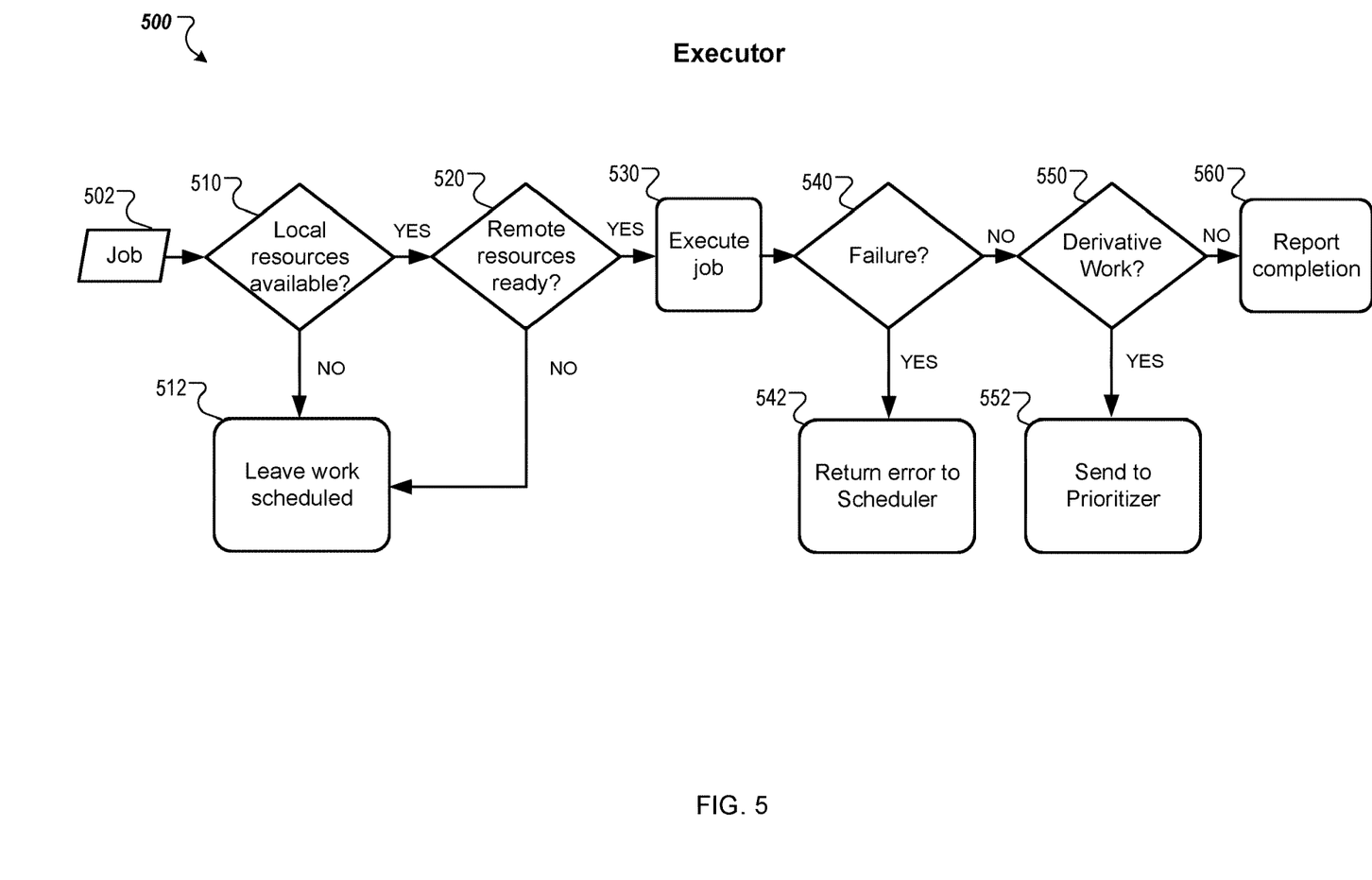
FIG. 5 is a flow diagram of an example process for executing jobs within a job management system for a distributed network.

The system includes an executor 230, which executes scheduled jobs and watches for errors, such as errors 234, during execution of the jobs as described in further detail with respect to FIG. 5. In some implementations, the executor 230 can be implemented as software. In some implementations, the executor 230 can be implemented as a component including one or more processors. The executor 230 sends job failures back to the scheduler 220 to determine if they should be retried. The executor 230 also detects derivative work, such as derivative work 232, or work derived from the execution of a particular job. For example, a reboot required after a software download job can be derivative work, or a new job to be executed. The executor 230 can then send the derivative job back to the prioritizer 210 for follow-up.

If the job execution is successful, and thus the job is completed, the executor 230 can report the completion of the job to the distributed network as described in further detail with respect to FIG. 5.

The job management system enables visualization of the status of each job and of the system as a whole by having each module expose and report its status, and by making the status of each job available through job metadata.

The job management system can receive a job cancellation request 240. Within the job management system, job cancellation requests such as job cancellation request 240 can be provided to the prioritizer 210 for handling. As described in further detail below with respect to FIG. 6, prioritizer 210 can handle and execute a job cancellation.

FIG. 3 is a flow diagram of an example process 300 performed by a prioritizer module in the job management system for the distributed network. For convenience, the process 300 will be described as being performed by a prioritizer including one or more computers located in one or more locations. For example, a prioritizer, e.g., the prioritizer 210 of FIG. 2, appropriately programmed in accordance with this specification, can perform the process 300.

A job is created and provided to the distributed network, which directs the job to the prioritizer (302). For example, a job can be created by a user or administrator of the distributed network. In some implementations, job creation can be triggered automatically based on factors such as an amount of time, particular network conditions, and user input, among other factors. For example, the distributed network and/or components connected to the network can trigger the creation of jobs.

Performing complex jobs can be difficult within a distributed network. In some implementations, when the prioritizer receives a job, the prioritizer can analyze the job and expand the job into multiple discrete sub-jobs, or sub-processes, that can be completed together as one unit.

When the prioritizer receives the job, the prioritizer first determines whether the job is of Immediate Run necessity (310). In one example, the prioritizer can examine the metadata of the job. In other examples, the prioritizer can determine, through examining other data associated with the job, the Job Necessity value associated with the job to determine whether the job is of Immediate Run necessity.

If the job is of Immediate Run necessity, then the prioritizer moves the job before all non-Immediate Run jobs (312). For example, the prioritizer can maintain a queue of jobs to be scheduled for execution. This queue of jobs can be maintained by the prioritizer and queried by the scheduler, which can then schedule jobs from the queue for execution. The prioritizer can insert the job that is of Immediate Run necessity before all jobs that do not have a Job Necessity value of Immediate Run. In some implementations, the prioritizer can insert the job after other Immediate Run jobs. For example, as described below, the prioritizer can use the Job Priority value of the job to determine where the job should be inserted with respect to other jobs having a Job Necessity value of Immediate Run.

If the job is not of Immediate Run necessity, the prioritizer continues by determining whether the job is of Best Effort necessity and whether the job has already been requested (320). For example, if the job is of Best Effort necessity and the job has already been requested, the prioritizer can determine that the job should not be scheduled for execution because the executing the job would be inefficient. In some examples, the prioritizer can determine that a similar job, that would be performing a similar process, has already been requested and that it would be more efficient to cancel the current job instead of scheduling the job, which would achieve a similar result or perform a similar process, for execution.

In one example, if the job is of Best Effort necessity and has already been requested, the prioritizer returns an error (322). For example, the prioritizer may determine that scheduling the job for execution would be inefficient, and return an error. The prioritizer can generate an error message that indicates the particular error occurring; in this particular example, the prioritizer can generate an error message that indicates that the job is of Best Effort necessity and has already been requested.

If the job is not of Best Effort necessity and/or has not already been requested, the prioritizer determines whether the job has metadata (330). For example, the prioritizer may determine that the job is not of Best Effort necessity and/or has not already been requested, and therefore that the job can proceed in the process to be scheduled for execution, and determine whether the job has metadata that provides additional information and/or constraints regarding the scheduling and/or execution of the job.

If the job has metadata, the prioritizer evaluates the job based on the metadata (332). For example, the prioritizer can examine the metadata of the job to determine characteristics of the job, including characteristics as described above with respect to FIG. 2, including Job Necessity, Job Priority, Job Status, and Device Limits, among other characteristics.

If the job does not have metadata, the prioritizer moves the job to the back of the queue for scheduling (340). For example, upon reaching step 340, the prioritizer can insert the job into the queue at the end, behind all other jobs to be scheduled, because the job does not have metadata and the prioritizer has already examined and determined the value of the characteristics of value to the prioritization process.

When the prioritizer inserts a job in the queue for scheduling, the job is not scheduled for execution. The prioritizer maintains a queue for the purposes of prioritizing jobs to later be scheduled by the scheduler for execution.

FIG. 4 is a flow diagram of an example process 400 performed by a scheduler module in the job management system for the distributed network. For convenience, the process 400 will be described as being performed by a scheduler including one or more computers located in one or more locations. For example, a scheduler, e.g., the scheduler 220 of FIG. 2, appropriately programmed in accordance with this specification, can perform the process 400.

When the scheduler schedules a particular job for execution, if the particular job is not currently being executed, a different, more urgent or higher priority job can still be scheduled for execution prior to the execution of that particular job.

The scheduler receives job priorities from prioritizer (402). In some implementations, the scheduler requests priority data for particular jobs that are about to be scheduled. For example, the scheduler can pull jobs from the prioritizer's queue for scheduling, and for each job in the queue, the scheduler can request priority data. In some implementations, the prioritizer provides the priority data to the scheduler automatically. For example, the prioritizer can maintain the queue such that the queue is in order from highest priority to lowest priority. In some implementations, the prioritizer can push jobs to the scheduler for scheduling and include the priority data with the job.

The scheduler then evaluates the top priority for each network element to determine whether particular resources are available (410). For example, the scheduler can evaluate the top priorities for each network element for each job in the prioritizer's queue to determine whether the network element is free and available for executing a job.

If the scheduler determines that the top priority job for a network element is not currently being executed, and therefore the network element is free, the scheduler can schedule a job for execution (420). For example, the scheduler can determine that a network element is free because no job priority overrides the current job's priority, and therefore the network element can be used to schedule the current job for execution.

If the scheduler determines that a job is already scheduled for execution, and thus resources are unavailable, the scheduler will wait for the job currently scheduled for execution to finish (430). In one example, the scheduler can schedule jobs for execution one at a time, such that only one job is scheduled for execution at once. In other examples, the scheduler can schedule multiple jobs to be executed contemporaneously, if the resources are available. However, because scheduling a particular job for execution means that the job is queued to be executed next, but the scheduling happens prior to execution and separately from the prioritization, the job management system includes multiple points at which a job can be inserted and cancelled, providing a high level of control over which jobs are executed, when a job is executed, and how a job is executed. Because the scheduler schedules jobs for execution from the priority queue, the job management process is agile and able to accommodate changes in network conditions and respond to any emergency conditions that arise.

Once the already scheduled job is finished, the scheduler can schedule the current job for execution (420). For example, the scheduler can receive a report or other type of information indicating that the already scheduled job has completed execution or otherwise finished (e.g., the job execution failed, but is a Stop on Error job) and schedule the current job for execution.

Additionally, the scheduler can also receive information indicating the failure of an execution (450). For example, the scheduler can receive a report indicating the failure of execution of a scheduled job or other information, such as a variable that can be queried, that indicates the failure of execution of a scheduled job.

The scheduler can then determine whether the job indicated in the execution failure information is a Best Effort job, a Stop on Error job, or neither type of job (460). For example, the scheduler can examine the metadata of the job indicated in the execution failure information or the execution failure information itself to determine the Job Necessity value of the job.

If the job indicated in the execution failure information is a Best Effort job or a Stop on Error job, the scheduler does not reschedule the job (470). For example, if the scheduler determines that the job indicated in the execution failure information is a Stop on Error job, the scheduler can determine that the job should not rescheduled, since an error occurred and the job management system should stop attempting to execute the job.

If the job indicated in the execution failure information is not a Best Effort job or a Stop on Error job, the scheduler determines whether a job is already scheduled for execution (480). For example, if the scheduler determines that the job indicated in the execution failure information is neither a Best Effort job nor a Stop on Error job, the scheduler can next determine whether another job is already scheduled for execution.

If a job is already scheduled for execution, the scheduler waits for the scheduled job to finish (430). As described above, the scheduler is agile and can schedule jobs immediately prior or just-in-time for execution. In one example, the scheduler schedules jobs for execution one at a time, acting as a responsive queue for execution. If a job is already scheduled for execution, the scheduler can wait for the scheduled job to finish prior to scheduling the current job for execution, following the process 400 as described above.

If a job is not already scheduled for execution, the scheduler schedules the job for execution (420). As described above, the scheduler is agile and can schedule jobs immediately prior or just-in-time for execution. If a job is not already scheduled for execution, the scheduler can proceed to schedule the current job for execution, following the process 400 as described above.

FIG. 5 is a flow diagram of an example process 500 performed by an executor module in the job management system for the distributed network. For convenience, the process 500 will be described as being performed by an executor including one or more computers located in one or more locations. For example, an executor, e.g., the executor 230 of FIG. 2, appropriately programmed in accordance with this specification, can perform the process 500.

A scheduled job comes to the executor for execution (502). For example, the executor can receive a scheduled job from the scheduler. In some implementations, the scheduler can schedule a job by maintaining a queue and pushing the next scheduled job to the executor.

The executor determines whether local resources required for execution of the job are available (510). For example, the executor can query network elements to determine whether local resources at the network element at which the executor is being implemented are available. In some implementations, local resources include resources within the same node or portion of the distributed network, such that local resources include resources at multiple nodes that are proximate to the network node at which the executor is being implemented.

If no local resources required are available, the executor leaves the job scheduled (512).

If local resources required are available, the executor then determines whether remote resources required for execution of the job are ready (520). For example, the executor can determine whether remote resources at another network element that are required for the execution of the current job are ready by querying other network nodes or by receiving, for example, indications from the other network nodes, whether particular resources are ready and available to perform the current job.

If remote resources required for execution of the job are not ready, the executor leaves the job scheduled (512). For example, if the executor determines that remote resources required to execute the current job are not ready, the executor can wait for the remote resources to become available or the executor can begin executing the next job that is scheduled for execution by beginning process 500 over again.

If remote resources required for execution of the job are ready, the executor executes the job (530). For example, if the executor determines that the remote resources required to execute the job are ready, the executor can begin execution of the job.

The job management system advantageously integrates with various networks by looking to the distributed network to perform jobs, needing only to provide instructions for beginning the jobs and without requiring the details of how to execute any particular process. Thus, the job management system can be implemented within various different networks having different processes and resources, because the job management system fully integrates with each network to control and manage jobs using existing infrastructure and existing processes to provide transparency into and control over the job management process.

Once the executor has attempted to execute a job, the executor then determines whether the job execution resulted in a failure (540). For example, the executor may detect an error in execution and generate an error report or other failure indication or information.

If the job execution results in a failure, the executor returns an error to the scheduler in the system (542). For example, if the job execution fails due to a change in network conditions or an outage in a portion of the network, the executor can generate an error report that indicates the cause of the error, any relevant components or elements of the network, the error itself, and the affected job. The error report can include less information (e.g., only an indication of an error occurring, etc.) or more information (e.g., information indicating the time of the error, a suggested troubleshooting process, information to be provided to a user or administrator, contact information for a particular user to be alerted, etc.) In some implementations, the error report is generated by the executor based on information gathered from the distributed network elements, which report the error. In some implementations, the error report is generated by the executor automatically and without requiring information from other network elements.

The job management system provides a robust error reporting system, allowing for users and/or administrators of the system to provide input regarding how to handle particular errors while also being able to determine, based on information from the distributed network and any information associated with the particular job affected, error handling instructions and processes.

If the job execution does not result in a failure, the executor determines whether the job results in derivative work (550). For example, the executor can determine whether the job that was executed results in other processes that need to be performed. In one example, a software update may require a reboot of a portion of a network. In this example, the software update would be the job that was executed, and the reboot of a portion of the network would be derivative work. In another example, the integration of two distributed networks may require a change in network settings for one of the distributed networks. In this example, the integration of the two networks would be the job that was executed, and the change in network settings for one of the networks would be derivative work. The executor can, for example, identify a particular job or sub-process to be performed in order to complete the derivative work. The executor can create a job based on the derivative work determined and provide the job to the prioritizer (552) to be put through the job management process as described with respect to FIGS. 2-5. For example, the executor can automatically determine, based on the resulting behavior of the network elements in response to the job that was executed, what jobs need to be performed, what resources are required, what network elements are affected, how long the jobs may take, and/or the priorities of the jobs, among other information.

The job management system is adaptable to various distributed network architectures and processes. Although distributed networks can include many different network elements that include processes that can required network element-specific derivative work, the job management system as a whole does not need to know how to execute particular processes or what derivative work is required. The executor module is the only module that determines whether and what derivative work should be performed, and generates jobs to be provided to the prioritizer and scheduler for processing, keeping the job management system flexible and applicable to many different systems, such that any optimizations or changes required for a particular distributed network can be localized to the executor module, and allowing intervention at multiple points throughout the process.

The modules of the job management system share data, and can update various settings, heuristic target values, and other data based on the performance of the job management system and the distributed network. For example, the job management system can update estimated job completion times based on the actual job completion times as measured by the job management system. In some implementations, the job management system can update the job processes or information based on any determined resources required or derivative work. For example, if the job management system determines that a software update from a particular vendor often requires rebooting a specific portion of the distributed network and specific user devices, the job management system can update the software update jobs from the particular vendor to include a reboot command.

If the execution of the job does not result in derivative work, the executor reports the completion of the job to the distributed network (560). For example, the executor can generate a report indicating that the job has been completed. In some implementations, the executor can simply mark a job as complete by updating the value of a variable or otherwise updating a source of information.

Figure 6:
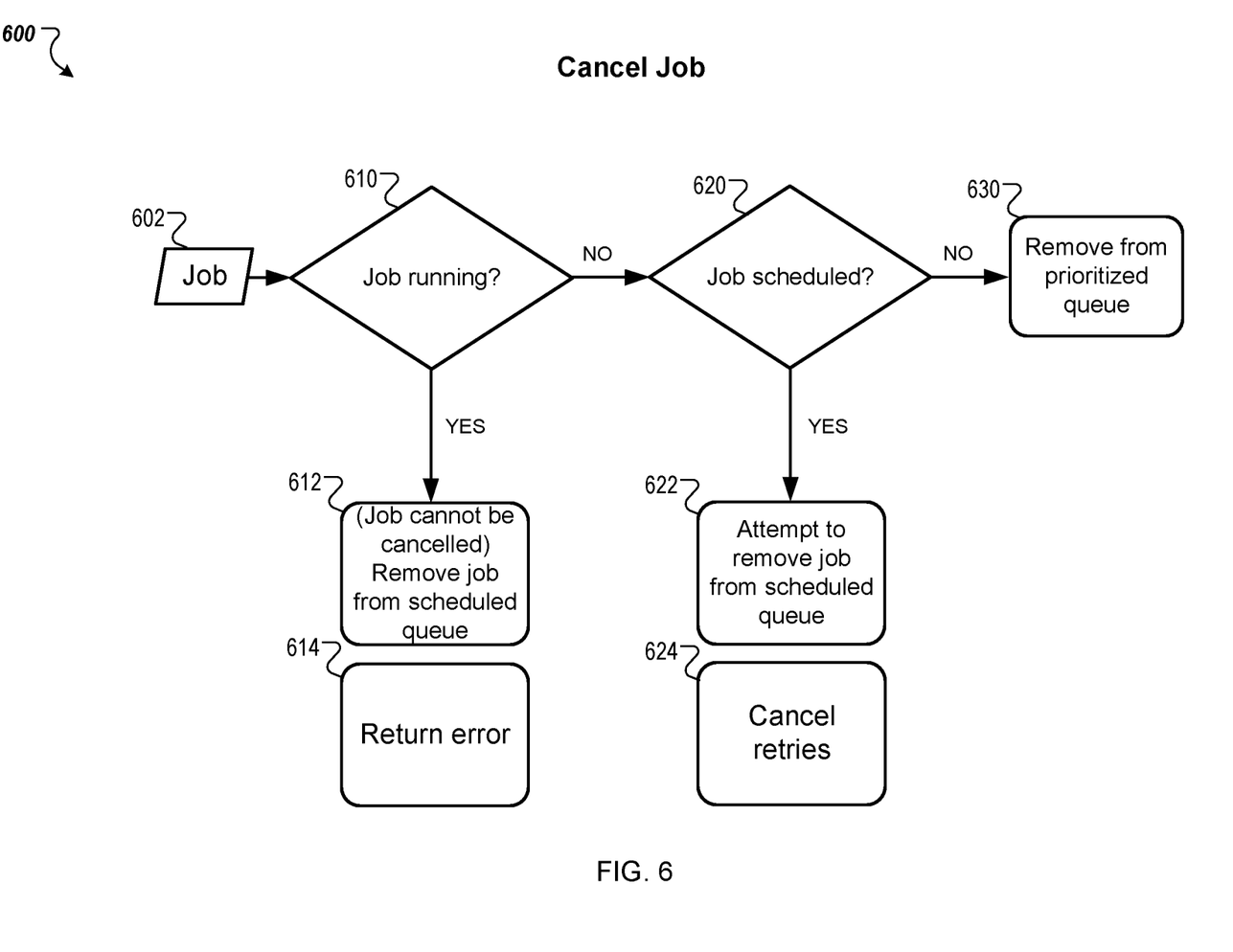
FIG. 6 is a flow diagram of an example process for cancelling a job within a job management system for a distributed network.

FIG. 6 is a flow diagram of an example process 600 performed by a prioritizer module in the job management system for the distributed network. For convenience, the process 600 will be described as being performed by a prioritizer including one or more computers located in one or more locations. For example, a prioritizer, e.g., the prioritizer 210 of FIG. 2, appropriately programmed in accordance with this specification, can perform the process 600. Process 600 can be an example implementation of the job cancellation process 240 as described briefly above with respect to FIG. 2.

The prioritizer can receive a request to cancel a job (602). For example a user and/or administrator of the distributed network can provide a job cancellation request to the prioritizer. In some implementations, the prioritizer itself or other modules of the job management system can determine that a job should be cancelled because there is a duplicate or similar job that has already been requested, or because a more efficient or higher priority job is being requested, among other conditions.

The prioritizer then determines whether the job being cancelled is currently running (610). For example, the prioritizer can then determine whether the job being cancelled is currently being executed, or running, by the executor, by querying the Job Status field of the job. The prioritizer can communicate with other modules of the job management system to determine the status of a particular job. For example, the prioritizer can query the scheduler to determine the status of the job because the scheduler can maintain the status of all ongoing jobs within the job management system.

If the job being cancelled is currently being executed, the job cannot be cancelled. In some implementations, a modular component of the job management system can support cancelling. For example, rollback of a job can be implemented by the job management system. In one example, if a Best Effort job is currently being executed, the prioritizer may be able to stop the executor.

Additionally, the prioritizer can request that the job be removed from the queue maintained by the scheduler so that the job will not be retried should an error occur during execution (612). For example, the prioritizer can communicate with the scheduler to attempt to remove the job for which a cancellation request was received from the scheduled queue. If the job does not execute as expected and an error occurs, the job will not be retried as it has been removed from the scheduled queue.

Additionally, the prioritizer can return an error to the user and/or administrator or network element requesting cancellation of the job (614). For example, the prioritizer can generate and provide an error report to an end user requesting cancellation of a software upgrade for their work computer if the software upgrade is already being executed and cannot be stopped. The error report can include information such as the time, the cause of the error, relevant network elements, etc.

If the job is not currently executing, the prioritizer determines whether the job being cancelled is scheduled for execution (620). For example, the prioritizer can communicate with the scheduler to determine whether the job being cancelled is scheduled for execution by querying the scheduler's queue or examining the Job Status field to determine whether the job is scheduled for execution.

If the job is scheduled for execution by the scheduler, the prioritizer can communicate with the scheduler to attempt to remove the job from scheduled queue (622). For example, the prioritizer can communicate with the scheduler to request that the job is removed from the scheduler's queue.

Additionally, the prioritizer can cancel any retries that may be specified for the job being cancelled, even if the job is of a priority such as Immediate Run or Eventually Complete, which indicate that the job should be retried upon experiencing an execution failure (624). For example, the prioritizer can communicate with the scheduler to request that all retries for the job are cancelled.

If the job being cancelled is not currently running or scheduled for execution, the job may be cancelled by removing the job from the prioritized queue (630). For example, if the job being cancelled is not currently running or scheduled for execution, the prioritizer can still remove the job from the prioritized queue.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework including, but not limited to, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A job management system for a distributed network, comprising:
   a prioritizer comprising one or more computers that are configured to prioritize job requests by performing operations comprising:
      receiving a request for a job to be performed by the distributed network;
      determining, based on metadata of the job within the request, a priority level for the job; and
      inserting, based on the determined priority level for the job, the job into a priority queue;
   a scheduler comprising the one or more computers that are configured to schedule jobs for execution by performing operations comprising:
      for each element in the distributed network:
         requesting, from the prioritizer and for the element, the priorities of one or more jobs scheduled for execution;
         evaluating, based on the priorities of the one or more jobs scheduled for execution, the priority of a particular job with respect to the network element;
         determining, based on the priorities of the one or more jobs, that the network element is free to perform job processes; and
      in response to determining that a network element is free to perform job processes, scheduling a particular job for execution; and
   an executor comprising the one or more computers that are configured to execute scheduled jobs within the distributed network by performing operations comprising:
      determining that (i) all local resources required for the scheduled particular job are available and (ii) all remote resources required for the scheduled particular job are available; and
      executing, according to processes defined within the distributed network, the scheduled particular job, wherein the prioritizer is configured to perform operations further comprising:
         receiving, from a requesting entity, a request to cancel an existing job;
         determining, based on metadata of the existing job, a job status of the existing job;
         in response to determining that the job status is that the existing job is running, returning, to the requesting entity, an error;
         in response to determining that the job status is that the existing job is scheduled for execution, providing, to the scheduler, a request that the scheduler remove the existing job from the scheduled queue; and
         in response to determining that the job status is that the existing job has been prioritized for scheduling, removing, from the priority queue, the existing job.

2. The system of claim 1, wherein the executor performs operations further comprising:
   identifying, based on a response from one or more elements of the distributed network, derivative work; and
   providing, to the prioritizer and without details of effects of the scheduled particular job on the distributed network, a second request for a job based on the derivative work.

3. The system of claim 1, wherein the executor performs operations further comprising:

determining, based on a response from one or more elements of the distributed network, that an error has occurred; and providing, to the scheduler, an error report indicating the error.

4. The system of claim 1, wherein the metadata of the job indicates at least one of a necessity of the job, the status of the job, or device limits.

5. The system of claim 1, wherein the prioritizer performs operations further comprising expanding, based on conditions of the distributed network, the job into two or more jobs.

6. The system of claim 1, wherein in response to determining that the job status is that the existing job is running further comprises providing, to the scheduler, a request that the scheduler remove the existing job from the scheduled queue.

7. A computer-implemented method for job management in a distributed network comprising:

receiving, by a prioritizer that prioritizes job requests, a request for a job to be performed by the distributed network;

determining, by the prioritizer and based on metadata of the job within the request, a priority level for the job;

inserting, by the prioritizer and based on the determined priority level for the job, the job into a priority queue;

for each element in the distributed network:
   requesting, for the element, by a scheduler that schedules jobs for execution and from the prioritizer, the priorities of one or more jobs scheduled for execution;
   evaluating, by the scheduler and based on the priorities of the one or more jobs scheduled for execution, the priority of a particular job with respect to the network element; and
   determining, by the scheduler and based on the priorities of the one or more jobs, that the network element is free to perform job processes;

in response to determining that a network element is free to perform job processes, scheduling, by the scheduler, a particular job for execution; and determining, by an executor that executes scheduled jobs within the distributed network, that (i) all local resources required for the scheduled particular job are available and (ii) all remote resources required for the scheduled particular job are available;

executing, by the executor and according to processes defined within the distributed network, the scheduled particular job, wherein the prioritizer performs operations further comprising:
   receiving, from a requesting entity, a request to cancel an existing job;
   determining, based on metadata of the existing job, a status of the existing job;
   in response to determining that the job status is that the existing job is running, returning, to the requesting entity, an error;
   in response to determining that the job status is that the existing job is scheduled for execution, providing, to the scheduler, a request that the scheduler remove the existing job from the scheduled queue; and
   in response to determining that the job status is that the existing job has been prioritized for scheduling, removing, from the priority queue, the existing job.

8. The method of claim 7, wherein the executor performs operations further comprising:

identifying, based on a response from one or more elements of the distributed network, derivative work; and providing, to the prioritizer and without details of effects of the scheduled particular job on the distributed network, a second request for a job based on the derivative work.

9. The method of claim 7, wherein the executor performs operations further comprising:

determining, based on a response from one or more elements of the distributed network, that an error has occurred; and providing, to the scheduler, an error report indicating the error.

10. The method of claim 7, wherein the metadata of the job indicates at least one of a necessity of the job, the status of the job, or device limits.

11. The method of claim 7, wherein the prioritizer performs operations further comprising expanding, based on conditions of the distributed network, the job into two or more jobs.

12. The method of claim 7, wherein in response to determining that the job status is that the existing job is running further comprises providing, to the scheduler, a request that the scheduler remove the existing job from the scheduled queue.

13. A non-transitory computer storage medium storing instructions executable by a data processing apparatus and that upon such execution cause the data processing apparatus to perform operations comprising:

receiving, by a prioritizer that prioritizes job requests, a request for a job to be performed by a distributed network;

determining, by the prioritizer and based on metadata of the job within the request, a priority level for the job;

inserting, by the prioritizer and based on the determined priority level for the job, the job into a priority queue;

for each element in the distributed network:
   requesting, for the element, by a scheduler that schedules jobs for execution and from the prioritizer, the priorities of one or more jobs scheduled for execution;
   evaluating, by the scheduler and based on the priorities of the one or more jobs scheduled for execution, the priority of a particular job with respect to the network element; and
   determining, by the scheduler and based on the priorities of the one or more jobs, that the network element is free to perform job processes;

in response to determining that a network element is free to perform job processes, scheduling, by the scheduler, a particular job for execution; and determining, by an executor that executes scheduled jobs within the distributed network, that (i) all local resources required for the scheduled particular job are available and (ii) all remote resources required for the scheduled particular job are available;

executing, by the executor and according to processes defined within the distributed network, the scheduled particular job, wherein the prioritizer performs operations further comprising:
   receiving, from a requesting entity, a request to cancel an existing job;
   determining, based on metadata of the existing job, a status of the existing job;
   in response to determining that the job status is that the existing job is running. returning, to the requesting entity, an error;

in response to determining that the job status is that the existing job is scheduled for execution, providing, to the scheduler, a request that the scheduler remove the existing job from the scheduled queue; and in response to determining that the job status is that the existing job has been prioritized for scheduling, removing, from the priority queue, the existing job.

14. The non-transitory computer storage medium of claim 13, wherein the executor performs operations further comprising:

identifying, based on a response from one or more elements of the distributed network, derivative work; and providing, to the prioritizer and without details of effects of the scheduled particular job on the distributed network, a second request for a job based on the derivative work.

15. The non-transitory computer storage medium of claim 13, wherein the executor performs operations further comprising:

determining, based on a response from one or more elements of the distributed network, that an error has occurred; and providing, to the scheduler, an error report indicating the error.

16. The non-transitory computer storage medium of claim 13, wherein the metadata of the job indicates at least one of a necessity of the job, the status of the job, or device limits.

17. The non-transitory computer storage medium of claim 13, wherein the prioritizer performs operations further comprising expanding, based on conditions of the distributed network, the job into two or more jobs.

* * * * *

UNITED STATES PATENT AND TRADEMARK OFFICE
CERTIFICATE OF CORRECTION

| | |
|---|---|
| PATENT NO. | : 12,106,143 B2 |
| APPLICATION NO. | : 17/381986 |
| DATED | : October 1, 2024 |
| INVENTOR(S) | : Thomas F. Guevin, Dennis Cox and Joshua Neely |

It is certified that error appears in the above-identified patent and that said Letters Patent is hereby corrected as shown below:

In the Claims

Column 20, Line 66, Claim 13, delete "running." and insert -- running, --

Signed and Sealed this
Nineteenth Day of November, 2024

*Katherine Kelly Vidal*

Katherine Kelly Vidal
*Director of the United States Patent and Trademark Office*